United States Patent
Diakides

[11] 3,887,724
[45] June 3, 1975

[54] METHOD OF MAKING HIGH CONTRAST FIBER OPTIC PHOSPHOR SCREEN

[75] Inventor: Nicholas A. Diakides, Alexandria, Va.

[73] Assignee: The United States of America as represented by the Secretary of the Army, Washington, D.C.

[22] Filed: Dec. 6, 1973

[21] Appl. No.: 422,457

Related U.S. Application Data

[62] Division of Ser. No. 308,886, Nov. 22, 1972, abandoned.

[52] U.S. Cl. .................. 427/64; 427/163; 350/96
[51] Int. Cl. ............................................ B44d 1/16
[58] Field of Search ............. 117/8, 8.5, 217, 93.31, 117/33.5 C, 33.5 CS, 33.5 CP, 211, 113, 117/212, 217

[56] References Cited
UNITED STATES PATENTS
3,054,672  9/1962  Angelucci, Jr. ................ 117/33.5 C

*Primary Examiner*—Cameron K. Weiffenbach
*Attorney, Agent, or Firm*—Robert P. Gibson; Nathan Edelberg; Milton W. Lee

[57] ABSTRACT

A method of making a fiber optic phosphor screen having high contrast capability in which the phosphor layer is arrayed only over the elemental fiber cores and not over the area of the cladding material surrounding the fiber optic cores.

2 Claims, 4 Drawing Figures

METHOD OF MAKING HIGH CONTRAST FIBER OPTIC PHOSPHOR SCREEN

The invention described herein may be manufactured, used, and licensed by or for the Government for governmental purposes without the payment to me of any royalty thereon.

CROSS REFERENCE TO A RELATED APPLICATION

This is a division of application Ser. No. 308,886 filed Nov. 22, 1972, now abandoned.

BACKGROUND OF INVENTION

The fiber optic phosphor screens presently available for use in image intensification devices employ a uniform coating of phosphor material over a fiber optic substrate. As a result of such an arrangement, image contrast is reduced. This occurs because the photons emitted by the excited phosphor may be propagated through fiber optic elements adjacent the primary fiber optic element resulting in cross-talk and an image of degraded contrast.

The use of the technique for producing the fiber optic phosphor screen disclosed herein results in increased image contrast by eliminating phosphor from the area of the cladding material and leaving an array of phosphor only over the fiber optic element cores.

SUMMARY OF THE INVENTION

The invention, then, is a high contrast fiber optic phosphor screen comprising a fiber optic substrate coated with an array of phosphor elements over the fiber optic cores; and a method of fabricating such a screen.

DESCRIPTION OF THE PREFERRED EMBODIMENT

Figure 1:
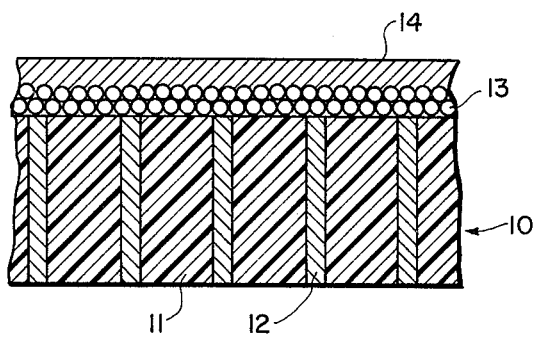
FIG. 1 is a prior art screen.

In FIG. 1, a prior art fiber optic phosphor screen can be seen. The screen comprises a substrate 10 composed of fiber optic core elements 11 surrounded by cladding 12. The phosphor material 13 completely covers the substrate 10. A reflective electrode 14, usually in the form of a lacquered aluminized coating, is applied over the phosphor material 13.

Figure 2:
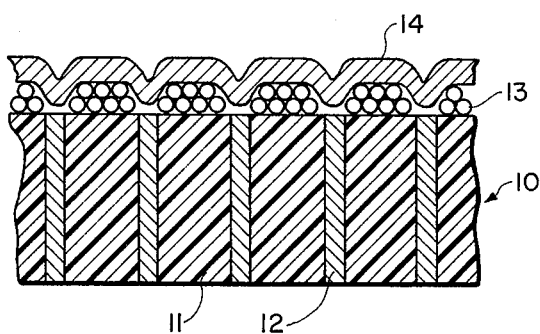
FIG. 2 is a cross-section of the disclosed screen.

FIG. 2, showing the arrayed phosphor coating of the instant invention discloses a similar fiber optic substrate 10; but with the phosphor array 13 located only over the fiber optic cores 11 and not over the cladding 12.

FABRICATION OF THE ARRAYED PHOSPHOR SCREEN

Figure 3:
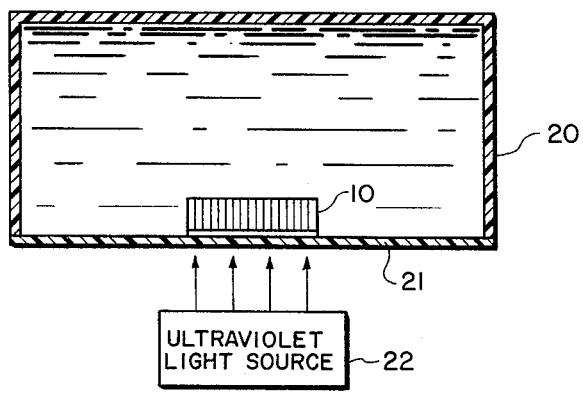
FIG. 3 shows the arrangement used to prepare the disclosed screen.

To produce the arrayed phosphor screen, a photosensitive liquid made of water, methanol and denatured alcohol in the proportions of 4:3:3 along with ammonia dichromate as the photosensitiver is placed in a quartz container 20 shown in FIG. 3; quartz being chosen because it freely transmits ultraviolet radiation. The fiber optic substrate 10 is placed in the container 20. The phosphor is added to the solution and allowed to settle on the substrate 10 until the desired thickness is achieved.

A masking means 21, having an aperture the size of the fiber optic substrate, masks the bottom of the container 20. An ultraviolet light source 22 located below the container is directed up through the substrate 10. Passing only through the elemental fiber optic cores 11, the radiation causes the phosphor over the core area to harden while the phosphor that settles over the cladding, not being exposed to the ultraviolet radiation, remains soft.

The substrate 10 is then taken from the container 20 and the soft phosphor over the cladding area removed using a jet of water on air. Baking the now coated substrate 10 eliminates any remaining organic material.

The final step consists of the application of a reflective electrode 14 as is conventionally done with such devices. This electrode is formed by overlaying a lacquered aluminized coating on the phosphor array.

Figure 4:
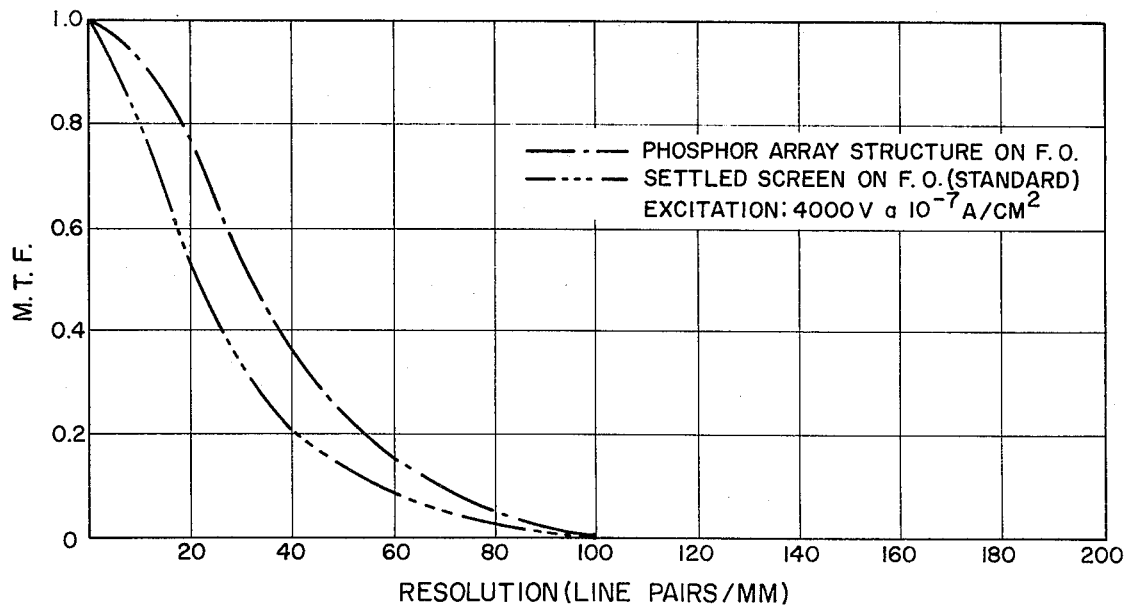
FIG. 4 is a graph showing a comparison between the arrayed phosphor screen structure and a prior art screen.

The improvement in contrast obtained from a fiber optic screen with the arrayed phosphor coating of the present invention can be seen in FIG. 4; which figure represents test results on modulation transfer function (MTF) for arrayed phosphor structure as compared with an ordinary coated screen of the prior art.

While a preferred embodiment of the invention has been described, it should be understood that variations thereof, substitutions and alterations, can be made without departing from the scope of the invention as defined by the following claims.

I claim:

1. A method of producing a high contrast fiber optic arrayed phosphor screen comprising the steps of:
   immersing in a photosensitive solution a fiber optic substrate composed of a plurality of fiber optic core elements surrounded by cladding material;
   adding phosphor to said solution and allowing the phosphor to settle onto the surface of said substrate to a desired thickness;
   directing ultraviolet radiation from the side opposite the phosphor coated surface of the substrate, said radiation passing through said fiber optic core elements to the phosphor layer; and
   removing the soft phosphor which was not exposed to the ultraviolet radiation and which remains over the cladding thereby forming said arrayed phosphor screen.

2. The method according to claim 1 further including the step of applying a reflective electrode coating over the arrayed phosphor screen.

* * * * *